C. S. KELLUM.
VALVE.
APPLICATION FILED OCT. 13, 1915.

1,172,464.

Patented Feb. 22, 1916.

Witnesses
Anna M Dorr.
Chas. W. Stauffiger

Inventor
Charles S. Kellum
By
Attorneys

UNITED STATES PATENT OFFICE.

CHARLES S. KELLUM, OF DETROIT, MICHIGAN, ASSIGNOR TO THE LAVIGNE MANUFACTURING COMPANY, OF DETROIT, MICHIGAN, A CORPORATION OF MICHIGAN.

VALVE.

1,172,464.

Specification of Letters Patent. Patented Feb. 22, 1916.

Application filed October 13, 1915. Serial No. 55,627.

*To all whom it may concern:*

Be it known that I, CHARLES S. KELLUM, a citizen of the United States of America, residing at Detroit, in the county of Wayne and State of Michigan, have invented certain new and useful Improvements in Valves, of which the following is a specification, reference being had therein to the accompanying drawings.

In the construction and assembly of valves for radiators and the like wherein the closure is of the ported sleeve type, it has been customary to limit the motion of the valve closure by stops which have necessarily been inserted after the valve parts have been assembled, and this causes an undue multiplication of parts, complexity of construction generally and difficulty of adjustment.

This invention relates to a valve for radiators or the like of the sleeve closure type and to an arrangement thereof whereby the stops that limit the motion of the closure are integral with the parts of the valve, the whole being readily assembled without the necessity of any location of the stops or the like after machining.

The invention consists in the matters hereinafter set forth, and more particularly pointed out in the appended claims.

Figure 2:
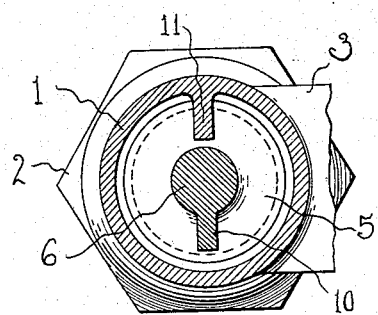
Figure 1:
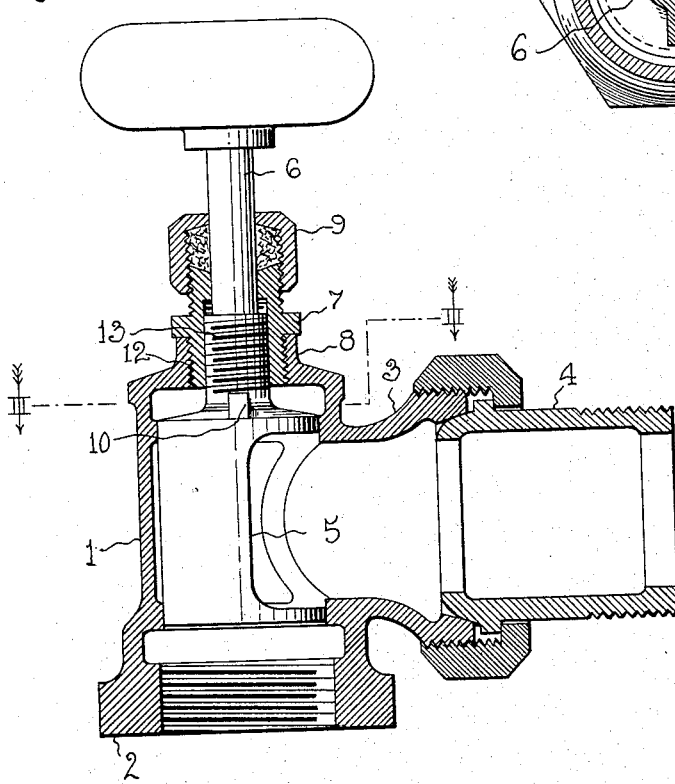

In the drawing, Figure 1 is a view in longitudinal section of a valve that embodies features of the invention, and Fig. 2 is a view in cross section taken on or about line II—II of Fig. 1.

As herein shown, a substantially cylindrical casing 1 has an inlet nipple 2 fitted for connection with a source of steam, hot air or water supply and a lateral outlet nipple 3 to which a union 4 or other preferred form of means for attaching to an outlet pipe or the like may be attached.

A hollow ported sleeve closure is journaled in the casing 1 so that the port thereof may be brought into register with the outlet end of the nipple 3 by proper manipulation of the sleeve.

A stem 6 that is integral preferably with the upper head of the sleeve 5, is screwthreaded through a cap 7 that is likewise screwthreaded into the integral head 8 of the casing 1. A packing gland 9 over the end of the bushing 7 and around the stem 6 prevents leakage. A stop 10 on the head of the sleeve 5, stem 6 adjacent the head, is adapted to contact with an integral stop 11 formed integrally on the head or the casing 1.

The bore of the inlet nipple 2 which is in axial alinement with the barrel or bore of the casing 1 is of sufficient diameter to permit the insertion of the ported sleeve 5 therethrough in assembling. When the latter is in place, the bushing 7 with which the stem 6 is in screwthreaded engagement is screwthreaded into the head of the casing and simultaneously on to the stem. The pitch of the threads 12 of the bushing 7 being identical with the pitch of the screw 13 on the stem 6. Therefore the parts are readily assembled as shown with the closure in proper position. As a result a valve of very simple construction is obtained that is readily detachable for inspection, renewal, and repair, that when once assembled does not need after insertion and adjustment of stops limiting the movement of the closure, and has as few parts as possible and thus avoids leakage.

Obviously, changes in the details of construction may be made without departing from the spirit of my invention and I do not care to limit myself to any particular form or arrangement of parts.

What I claim is:—

1. A valve comprising a main casing having an inlet opening at one end and an internal screwthreaded opening at the other end with a lateral nipple outlet between the ends, a ported sleeve closure rotatable in the casing in axial alinement with the inlet opening through which it is insertible, the upper end of the closure having a head from which extends a screwthreaded stem through the bushing opening of the casing, a bushing screwthreaded into the casing opening and on to the inclosed portions of the stem, the screw threads forming the engagement between the bushing and casing and between the bushing and closure being identical in pitch, a stop integrally formed on the casing, and a stop integrally formed on the closure adapted to be moved into abutment with the casing stop.

2. A valve comprising a substantially cylindrical casing having an axial inlet opening at one end and an alined axial bushing opening at the other end with a lateral outlet opening between them, a ported sleeve closure rotatable in the casing with the opening thereof adapted to register with the outlet opening of the casing, a stem formed integrally on the upper end of the closure in concentric relation with the casing bushing opening through which it extends, screw threads on the interior of the casing bushing opening, screw threads on the adjacent portions of the stem of similar pitch to the casing bushing opening threads, a bushing screwthreaded into the opening and on to the stem, and stops integrally formed respectively on the casing and on the closure and adapted to limit the motion of the closure.

In testimony whereof I affix my signature in presence of two witnesses.

CHARLES S. KELLUM.

Witnesses:
ANNA M. DORR,
CHAS. W. STAUFFIGER.

Copies of this patent may be obtained for five cents each, by addressing the "Commissioner of Patents, Washington, D. C."